US009495868B2

(12) United States Patent
Jang et al.

(10) Patent No.: US 9,495,868 B2
(45) Date of Patent: Nov. 15, 2016

(54) TRAFFIC DATA SIMULATOR

(71) Applicant: HERE Global B.V., Veldhoven (NL)

(72) Inventors: Dongwook Jang, Lisle, IL (US); Praveen Arcot, Naperville, IL (US)

(73) Assignee: HERE Global B.V., Eindhoven (NL)

( * ) Notice: Subject to any disclaimer, the term of this patent is extended or adjusted under 35 U.S.C. 154(b) by 33 days.

(21) Appl. No.: 14/069,664

(22) Filed: Nov. 1, 2013

(65) Prior Publication Data

US 2015/0127243 A1 May 7, 2015

(51) Int. Cl.

| | |
|---|---|
| ***G06F 19/00*** | (2011.01) |
| ***G06G 7/70*** | (2006.01) |
| ***G06G 7/76*** | (2006.01) |
| ***G08G 1/00*** | (2006.01) |
| ***G08G 1/01*** | (2006.01) |

(52) U.S. Cl.

CPC ............ *G08G 1/0116* (2013.01); *G08G 1/012* (2013.01); *G08G 1/0129* (2013.01); *G08G 1/0141* (2013.01)

(58) Field of Classification Search

CPC ..... H04L 43/026; H04L 12/14; H04L 41/22; G08G 1/096775; G08G 1/127; G08G 1/20; G08G 1/096811; G08G 1/01; G08G 1/065; G08G 1/091; G08G 1/08; G08G 1/096716; G08G 1/166; G08G 1/16; G08G 1/052; G08G 1/012; G08G 1/015; G08G 1/017; G01C 21/3694; G01C 21/36; G01C 21/32; G01C 21/3407; G01C 21/3697; G01C 21/165

USPC ....... 701/117, 1, 118, 119, 414, 423, 412, 2, 701/540, 100, 22, 408

See application file for complete search history.

(56) References Cited

U.S. PATENT DOCUMENTS

| | | | | | |
|---|---|---|---|---|---|
| 6,256,577 | B1 * | 7/2001 | Graunke | G01C 21/3694 | 701/117 |
| 6,842,620 | B2 * | 1/2005 | Smith | G08G 1/0104 | 340/539.1 |
| 7,536,254 | B2 * | 5/2009 | Kumagai | G08G 1/0104 | 340/934 |
| 7,542,844 | B2 * | 6/2009 | Kumagai | G08G 1/0104 | 340/934 |
| 7,555,381 | B2 * | 6/2009 | Kumagai | G01C 21/26 | 340/934 |
| 7,617,041 | B2 * | 11/2009 | Sera | G08G 1/01 | 701/119 |
| 7,706,963 | B2 * | 4/2010 | Parikh | G08G 1/127 | 340/901 |
| 7,755,509 | B2 * | 7/2010 | Bespalov | G08G 1/0104 | 340/905 |
| 7,908,076 | B2 * | 3/2011 | Downs | G08G 1/0104 | 701/117 |
| 7,912,627 | B2 * | 3/2011 | Downs | G08G 1/0112 | 701/117 |

(Continued)

*Primary Examiner* — Fadey Jabr
*Assistant Examiner* — Luis A Martinez Borrero
(74) *Attorney, Agent, or Firm* — Lempia Summerfield Katz LLC

(57) ABSTRACT

In one embodiment, traffic data that originates from sensors, cameras, or observations is analyzed. The traffic data is associated with multiple repeating time epochs or intervals. The traffic data is divided into clusters using a clustering technique. The clustering technique may include clusters of variable sizes. Each of the clusters is analyzed to calculate statistical parameters including but not limited to an average value for one or more clusters and a standard deviation value for one or more clusters. In response to a request for traffic data, simulated traffic data may be generated by providing the average value and the standard deviation value for one or more of the clusters.

18 Claims, 7 Drawing Sheets

(56) References Cited

U.S. PATENT DOCUMENTS 7,912,628 B2 * 3/2011 Chapman ........... G01C 21/3691 701/117
7,948,400 B2 * 5/2011 Horvitz ................ G08G 1/0104 340/933
8,264,375 B2 9/2012 DeVries
8,405,521 B2 * 3/2013 Fujiwara .............. G08G 1/0104 340/901
8,531,318 B2 9/2013 Denaro
8,554,871 B2 10/2013 Samsalovic
8,775,941 B1 * 7/2014 Deshpande ............. H04L 67/22 715/736
8,918,278 B2 * 12/2014 Feldman .............. G08G 1/0104 701/118
2005/0027434 A1 2/2005 Hirose
2005/0125195 A1 * 6/2005 Brendel .............. H04L 12/2602 702/182
2005/0171649 A1 * 8/2005 Adachi .............. G01C 21/3691 701/1
2006/0064234 A1 * 3/2006 Kumagai ............. G08G 1/0104 701/117
2006/0247846 A1 11/2006 Cera et al.
2007/0053324 A1 * 3/2007 Hwang .................... G08G 1/08 370/335
2007/0171095 A1 7/2007 Mochizuki
2007/0198176 A1 * 8/2007 Endo ...................... G01C 21/26 701/450
2007/0208496 A1 * 9/2007 Downs ................. G08G 1/0112 701/117
2007/0213922 A1 * 9/2007 Van Buer ............. G08G 1/0104 701/117
2008/0071466 A1 3/2008 Downs et al.
2008/0123545 A1 * 5/2008 Watanabe ............. H04L 43/026 370/252
2009/0082948 A1 * 3/2009 Hiruta .................. G08G 1/0104 701/117
2009/0248286 A1 10/2009 Nagase et al.
2010/0138108 A1 * 6/2010 Kajino ................. B60G 17/016 701/38
2010/0204885 A1 * 8/2010 Kajino ............... B60G 17/0157 701/37
2010/0268459 A1 * 10/2010 O'Shea .................. G01C 25/00 701/532
2010/0328100 A1 12/2010 Fujiwara et al.
2011/0131597 A1 6/2011 Cera et al.
2014/0288776 A1 * 9/2014 Anderson ............ B60G 17/016 701/37

* cited by examiner

TRAFFIC DATA SIMULATOR

FIELD

The following disclosure relates to a traffic data simulator, or more particularly, a parameterized traffic data simulator using clustering.

BACKGROUND

Traffic Message Channel (TMC) and other traffic services deliver traffic information to customers. Traffic incidents and traffic flow are reported through broadcasts. Traffic delays may be caused by one or more of congestion, construction, accidents, special events (e.g., concerts, sporting events, festivals), weather conditions (e.g., rain, snow, tornado), and so on.

In some areas, broadcast messages contain up-to-the-minute reports of traffic and road condition information. These systems broadcast the traffic data over traffic message channels on a continuous, periodic, or frequently occurring basis. Traffic message receivers decode the data and provide up-to-the-minute reports of traffic and road conditions.

Traffic data may be used for other functions besides real time traffic broadcasts. Traffic data may be used for prediction models. In addition, historic traffic data may be used for city planning, construction routes, and other municipal functions. Historic traffic data sets may be very large and challenges remain in packaging the historical data efficiently.

BRIEF DESCRIPTION OF THE DRAWINGS

Exemplary embodiments of the present invention are described herein with reference to the following drawings.

DETAILED DESCRIPTION

As traffic cameras, traffic sensors, and other techniques for collecting traffic data have become more prevalent, the accuracy of traffic reports and traffic predictions has increased. However, the amount of raw traffic data has also grown. Traffic data may be organized by collection location, by road segment, by time of day, by day of week, and by other special days. Consider a stretch of highway represented by 100 road segments, time intervals of fifteen minutes, and data collected over the last 10 years. There are 96 fifteen minute intervals in a day, and 365 days per year. Thus, the traffic data for this hypothetical stretch of highway includes data for over 35 million instances (100 segments×96 intervals/day×365 days/year×10 years=35,040,000). The following embodiments analyze the traffic data to identify clusters of the traffic data that may be described using statistical parameters rather than raw data. The traffic data, or a near reproduction of the traffic data, which may be referred to as pseudo traffic data or simulated traffic data, may be reproduced using the statistical parameters.

Figure 1:
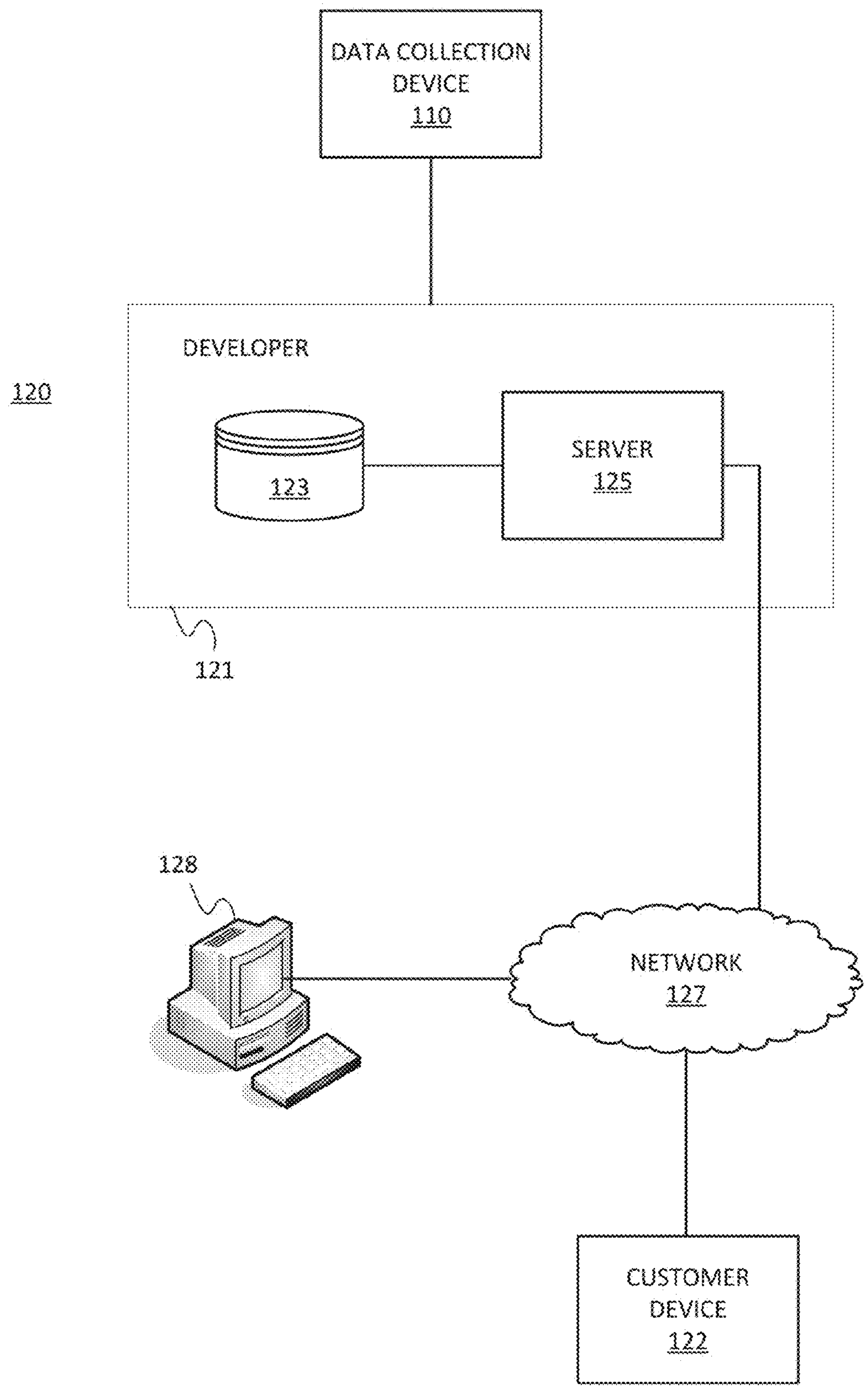
FIG. 1 illustrates an example system for traffic data simulation.

FIG. 1 illustrates an exemplary traffic data simulation system 120. The system 120 includes a data collection device 110, a developer system 121, a customer device 122, a workstation 128, and a network 127. Additional, different, or fewer components may be provided. For example, many customer devices 122 and/or workstations 128 may connect with the network 127. The developer system 121 includes a server 125 and a database 123. The developer system 121 may include computer systems and networks of a navigation system operator.

The data collection device 110 collects traffic data for the developer system 121. The data collection device 110 may include traffic sensors, traffic cameras, crowd sourcing applications, or any combination of devices that compile information about traffic. The crowd sourcing application may be executed on mobile devices traveling along roadways. The traffic data may describe the speed of traffic, distances between vehicles, or the volume (quantity) of vehicles traveling along various roadways. The speed of traffic may be the average speed of vehicles over a time period. The traffic data is stored by database 123.

The server 125 is configured to query and receive the traffic data from the database 123. The traffic data associated with multiple repeating time epochs. The size of the repeating time epochs may be configurable by the developer. Example sizes include 15 minutes, 30 minutes, 1 hour, or another value. In the example of 15 minute epochs, the traffic data is formatted into 96-dimensional vectors, in which each of the 96 components describes traffic for a different 15 minute epoch. For example, a daily traffic vector having 96 components may be defined as $\vec{x}=(x_1, \ldots, x_n)$, where n=96.

The values contained in the vector may be speeds for a given epoch. For example, the first element of the vector is the average speed for time between 0:00 a.m. to 0:15 a.m., and the $50^{th}$ element of the vector is the average speed for time between 12:15 p.m. and 12:30 p.m. Other vectors may be used.

The server 125 is configured to divide the traffic data into a plurality of clusters according to a clustering algorithm specialized for the analysis of traffic data. The clustering algorithm groups traffic data or traffic vectors. Similar sets of traffic data are identified. One example clustering algorithm is K-means clustering. The clustering may be performed on a daily basis using daily vectors or another basis (e.g., hourly, weekly, or geographically).

The server 125 selects a set of initial points or daily vectors. The daily vectors used as the initial points may be selected randomly. In one example, the daily vectors are number from 1 to N and K random numbers are selected between 1 and N. That is, the traffic data includes many daily vectors and the set of initial points is a subset of daily vectors randomly selected from the traffic data. The quantity of initial daily vectors may be any number K (e.g., 3, 5, 10, 30, 100, or another value). The value for K is configurable.

In one alternative, the set of initial points is not selected randomly. Instead, the first K daily vectors in the traffic data are used. Or, for example, when K=7, the first Monday, the first Tuesday, the first Wednesday, the first Thursday, the first Friday, the first Saturday, and the first Sunday from the traffic data are selected as the set of initial points. In another example, in which K=7, the sets of initial points includes a randomly selected daily vector for each day of the week. The randomly selected daily vectors may be only weekdays, exclude holidays, or another variation.

The server 125 designates each of the set of initial daily vectors as a centroid. The centroid is the fluctuating mean of a cluster. The server 125 analyzes the remaining daily vectors (those daily vectors not selected as initial points) and computes the difference between the remaining daily vectors and the centroids. For example, the server 125 may select a daily vector and compute the distance to each of the centroids to choose one of the clusters for the selected daily vector. Equation 1 provides an example calculation of distances between the remaining daily vectors (x) and centroids (y). The value for the binary operator ($w_i$) is 1 when both $x_i$ and $y_i$ are valid and 0 otherwise.

$$d(x, y) = \frac{\sum_{i=1}^{96} w_i(x_i - y_i)^2}{\sum_{i=1}^{96} w_i}. \qquad \text{Eq. 1}$$

The process may be iterative. The server 125 compares the distances to each centroid and groups each of the daily vectors with the closest centroid to form a cluster. The server 125 then recalculates the average of the cluster as a new centroid. Another remaining daily vector is selected, grouped with a cluster, and a new centroid for the cluster is calculated. This process repeats until all of the vectors are grouped into clusters.

In another example, all of the remaining daily vectors are assigned to clusters. Then new centroids are calculated. Some of the daily vectors may be moved when there is a different closest centroid. Because some of the daily vectors are moved to different clusters, new centroids are calculated. This may cause more daily vectors to move clusters. This process may be repeated until a clustering threshold is met.

In one example, the threshold is a fraction of membership change between one set of clusters to the next set of clusters. Membership change is the proportion of vectors whose cluster assignment changes from one iteration of the clustering technique to the next. Example fractions include 1/100, 1/10, or another value. In another example, the threshold is an average difference between the locations of new centroids and the location of the most recent centroids. The change in centroid locations from one iteration of the clustering technique to the next may be averaged or summed and compares to the threshold. Both example thresholds may be used, and the process is repeated upon either threshold being met.

The server 125 is configured to calculate an average value or a mean (μ) for each of the clusters according to Equation 2. The server 125 is also configured to calculate a standard deviation value (σ), which is the square root of the variance, for each of the clusters according to Equation 3. For Equations 2 and 3, N is the number of components or epochs in the vectors, i represents the number of epochs, and j represents the number of components in an epoch, such that $x_{ij}$ is the jth data value of the ith epoch.

$$\mu_i = \frac{1}{N_i}\sum_{j=1}^{N_i} x_{ij} \qquad \text{Eq. 2}$$

$$\sigma_i^2 = \frac{1}{N_i}\sum_{j=1}^{N_i} (x_{ij} - \mu_i)^2 \qquad \text{Eq. 3}$$

The server 125 is also configured to calculate a weighting factor for each of the clusters. The weighting factor represents the proportion of vectors in each cluster. For example, the weighting factor for cluster 1 is the number of vectors in cluster 1 divided by the total number of vectors. The weighting factors may be a value between 0 and 1 such that weighting factors of all of the vectors is 1, as shown by Equation 4.

$$\Sigma_{k=1}^{K} f_k = 1 \qquad \text{Eq. 4.}$$

The server 125 may receive a request for traffic data or simulated traffic data. The request may come from a customer such as customer device 122. Example customers include governments, city planners, universities, traffic map applications, or individual users. In one example, a future traffic prediction algorithm may be tested with the simulated traffic data. In another example, a potential road layout or traffic signal pattern may be tested with the simulated traffic data. In another example, the results of an artificial intelligence model (e.g., neural network, Bayesian network, or fuzzy network) are tested against the simulated traffic data.

The request could be generated in response to a user input at workstation 128. The request may be internal to the server 125. In response to the request, the server 125 may provide the average value and the standard deviation value for one or more of the clusters in response to the request for traffic data. The server 125 may also provide the weighting factor for the one or more clusters. The average value, standard deviation value, and weighting factors may be provided to the customer device 122 or to the traffic simulator at the server 125. Either the server 125 or the customer device 122 may run the simulation to produce the simulated traffic data.

The request for traffic data may specify a number of data points. The server 125 generates the simulated traffic data in the specified number of data points. The request for traffic data may specify, a time of day, a day of the week, or specific days of the year. The server 125 generates the simulated traffic data based only on the days specified in the request. The request for traffic data may specify a road segment or a route. The server 125 generates the simulated traffic data from traffic data collected at the specific road segment or route.

The traffic data simulation system calculates the simulated traffic data based on the standard deviation, the average, and the weighting factor. The simulated traffic data may be generated according to a distribution function. Example distribution functions include a Gaussian function, a normal distribution, or a bell curve. For example, the pseudo traffic data may be data generated from a Gaussian function given the inputs of the standard deviation and the average determined by the server 125.

The pseudo traffic data may also depend on the weighting factor and a random number algorithm. The weighting factor determines which of the clusters is used. The traffic data simulation system generates a random number within a predetermined range. The random number is used to randomly select one of the clusters to use for generating the simulated traffic data from the Gaussian function. The random number selection algorithm may be repeated for each point of the simulated traffic data or only one for each request for pseudo traffic data. That is, each point of the simulated traffic data may involve a unique random number or sets of points of the simulated traffic data may be generated through a single random number and cluster but through multiple iterations of the Gaussian or other function.

The example shown in Table 1 illustrates example weighting factors for a set of five clusters. The weighting factor represents the percentage of the daily vectors that are included in the cluster. In the example of Table 1, cluster 1 includes half of the traffic data used to define the clusters. The random number generator effectively selects a cluster according to random number (z) between 0 and 1.

TABLE 1

| Cluster | Percentage of Cluster | Weighting Factor | Random Number Range |
|---|---|---|---|
| Cluster 1 | 50% | 0.5 | $0 \le z \le 0.5$ |
| Cluster 2 | 30% | 0.3 | $0.5 < z \le 0.8$ |
| Cluster 3 | 10% | 0.1 | $0.8 < z \le 0.9$ |
| Cluster 4 | 7% | 0.07 | $0.9 < z \le 0.97$ |
| Cluster 5 | 3% | 0.03 | $0.97 < z \le 1.0$ |

The traffic data simulator may generate each point of the simulated traffic data based on the weighting factor. If the random number generator generates a value of 0.81, the traffic data simulator selects Cluster 3. Next, the Gaussian function with the standard deviation and mean values for Cluster 3 generates the simulated traffic data point. The data points may be generated one at a time or multiple data points at a time. The traffic data simulator generates another random fraction for the next simulated traffic data point or multiple data points. As a result, the clusters are used in a frequency proportional to the amount of daily vectors included in each cluster.

The simulated traffic data may also be customized by day of the week. Each cluster is analyzed to determine how many of the original daily vectors correspond to each day of the week. Based on the proportion, a day factor is assigned to each day for the cluster. Other organizations of days may be used. In one example, the clusters are organized between weekdays and weekend days. In another example, holidays are an additional category. In another example, holidays are divided between major holidays (e.g., Thanksgiving and Christmas) and minor holidays (e.g., Columbus Day and Veterans' Day). In another example, the days leading up to or following holidays are given a separate classification (e.g., adjacent holiday days).

As shown for the cluster in the example of Table 2, 20% of the original daily vectors corresponds to Mondays, 30% of the original daily vectors correspond to Tuesdays, and so on. The traffic data simulator is configured to generate a random number between 0 and 1. The random number is used to designate a data point from the simulated traffic data to a day of the week. In the example of Table 2, if the random number is 0.6, then the data point is designated as a Wednesday. In this manner, the days of the week of the simulated traffic data are proportional to the days of the week of the original traffic data.

TABLE 2

| Day of the Week | Percentage of Cluster | Day Factor | Random Number Range |
|---|---|---|---|
| Monday | 20% | 0.2 | $0 \le z \le 0.2$ |
| Tuesday | 20% | 0.3 | $0.2 < z \le 0.5$ |
| Wednesday | 20% | 0.2 | $0.5 < z \le 0.7$ |
| Thursday | 1% | 0.1 | $0.7 < z \le 0.8$ |
| Friday | 1% | 0.1 | $0.8 < z \le 0.9$ |
| Saturday | 0.05% | 0.05 | $0.9 < z \le 0.95$ |
| Sunday | 0.05% | 0.05 | $0.95 < z \le 1.0$ |

The server 125 may also be configured to optimize the value of K for the clustering algorithm. For example, the clustering algorithm may be performed using a default value for K. Example default values include 5, 10, and 20. The clustering algorithm is performed for each value of K from 1 to the default value or for each value of K from a minimum value (e.g., 2, 3, 5, or another value) to the default value when single cluster. The server 125 is configured to calculate the variance of the daily vectors in each cluster for each value of K. The variance may be calculated as $\sigma^2$ as described in Equation 3. The variances of the respective clusters are compared. The value of K that produces the least variance among daily vectors within each cluster may be stored as the optimal K value. The optimal K value may be used for the current request for simulated traffic data and/or subsequent requests for simulated traffic data.

In addition, the server 125 may be configured to merge clusters recursively. For example, when the number of daily vectors in a cluster is less than a minimum value, the cluster may be merged with another cluster. The other cluster may be the cluster having the nearest centroid. The minimum value for the number of vectors may be 5, 10, or another value.

In another example, two clusters may be merged when their respective centroids are less than a predetermined value apart. When the traffic data is measured in distance per unit time, the predetermined value may be 5 miles per hour, 10 kilometers per hour, 12 meters per second, or another value. In another example, the predetermined value to trigger merging is when the centroids of two clusters are less than the root mean squared (RMS) of the referring cluster.

FIGS. 2A-B, 3A-B, 4A-B and 5A-B illustrate example comparisons of raw traffic data and simulated data. FIGS. 2A, 3A, 4A, and 5A illustrate raw traffic data collected by sensors, mobile devices (e.g., smartphones), traffic camera image analysis, or through another process. The vertical or y-axes of the graphs are a measure of a traffic parameter. As shown, the traffic parameter is speed of the traffic. In other examples, the traffic parameter may be deceleration, vehicle spacing, braking frequency, or another parameter. The horizontal or x-axes of the graphs are time. The scale shown is a number of 15 minute epochs.

The raw data may be provided to the traffic data simulator described above. The raw data may be analyzed using a clustering technique, which may be optimized to the specific distribution of data shown in FIG. 2A, 3A, 4A, or 5A. The clusters of raw data may be described by statistical parameters. The statistical parameters may be used to generate simulated traffic data rather than store, transmit, or otherwise maintain the entire set of raw traffic data.

FIGS. 2B, 3B, 4B, and 5B illustrate simulated traffic data or pseudo traffic data derived from the statistical parameters. The solid line 220 in the data is the average or mean used to generate the simulated traffic data. The simulated traffic data may be statistically identical to the raw data. The simulated traffic data may be substantially the same shape and distribution as the raw data. The simulated traffic data may be a perfect substitute for the raw data in many traffic data applications such as the testing of other algorithms or applications (e.g., city planning, traffic routing, traffic signals).

Figure 2A:
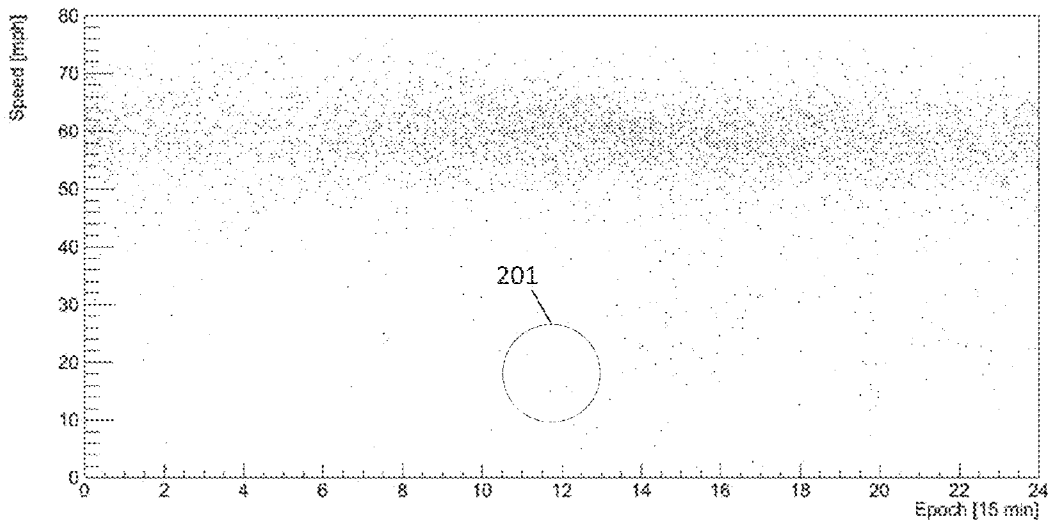
FIGS. 2A and 2B illustrate example comparison of raw traffic data and simulated data.
Figure 2B:
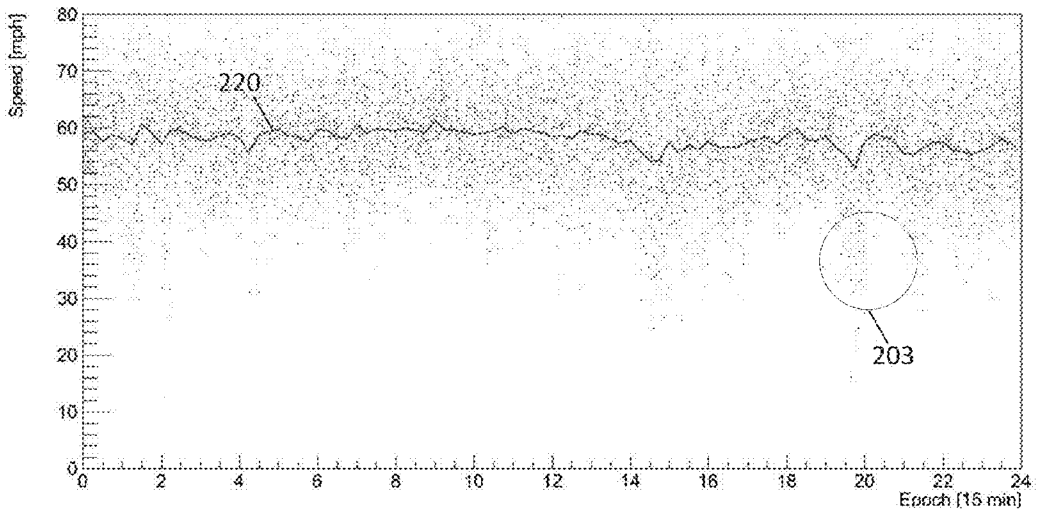
Figure 3A:
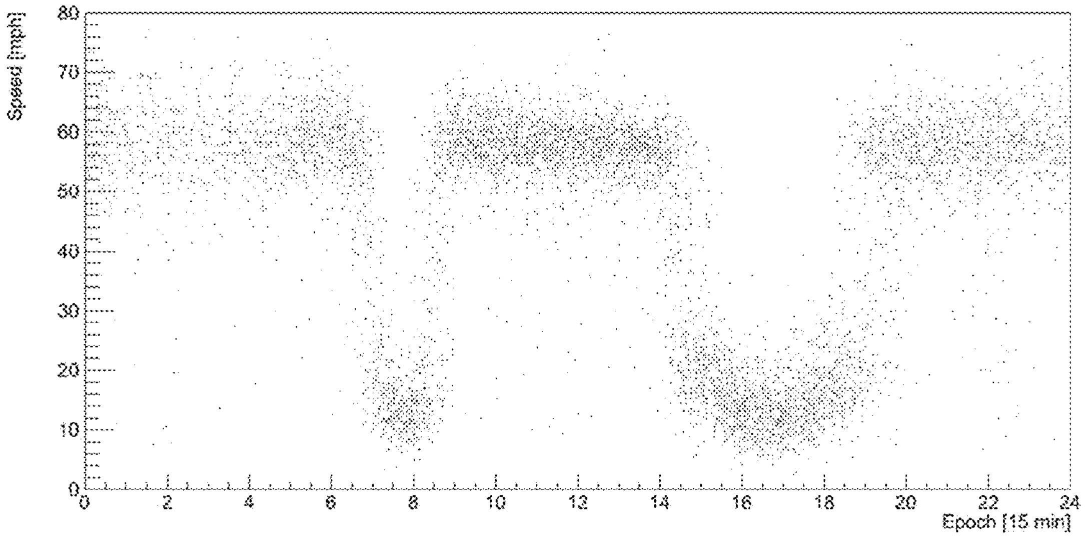
FIGS. 3A and 3B illustrate another example comparison of raw traffic data and simulated data.
Figure 3B:
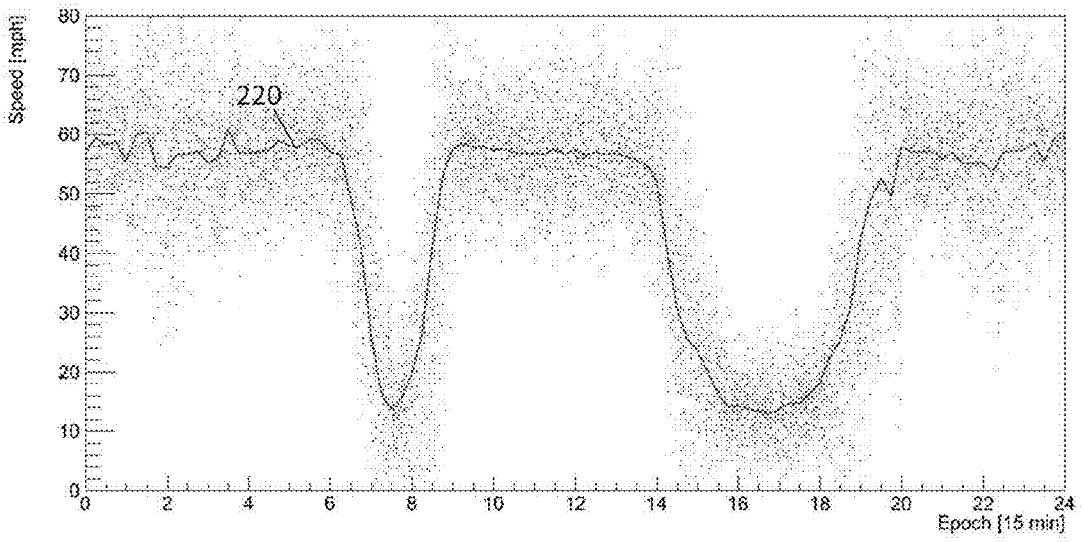
Figure 4A:
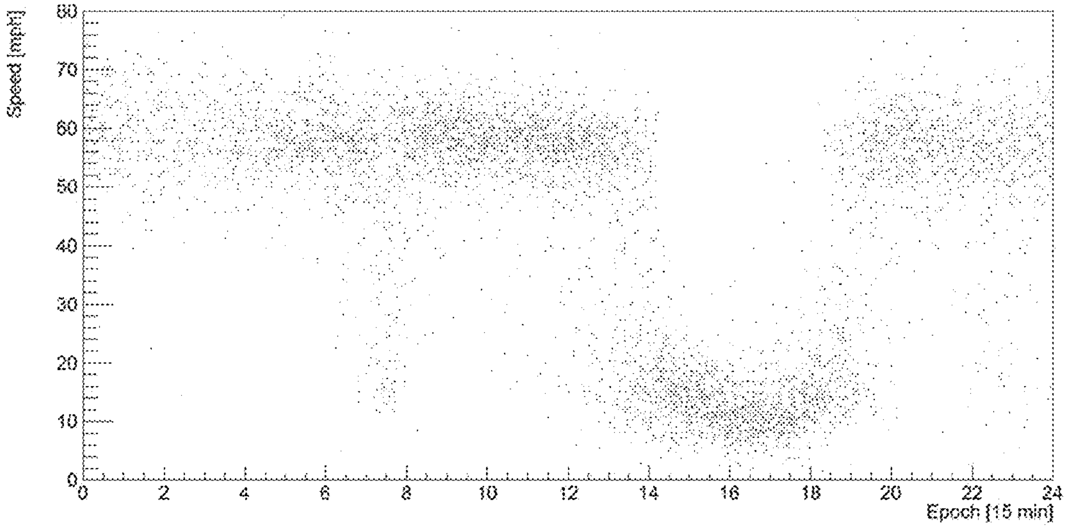
FIGS. 4A and 4B illustrate another example comparison of raw traffic data and simulated data.
Figure 4B:
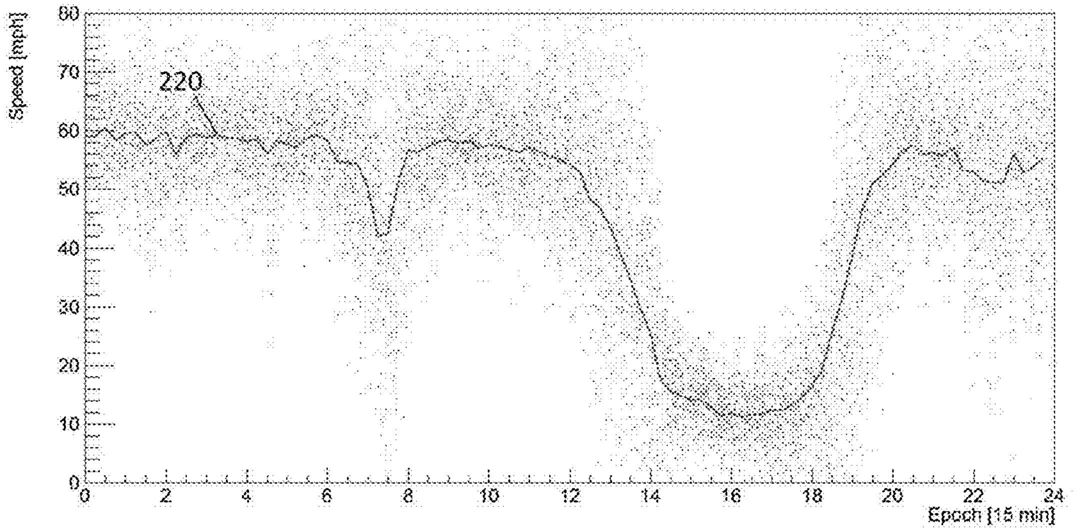
Figure 5A:
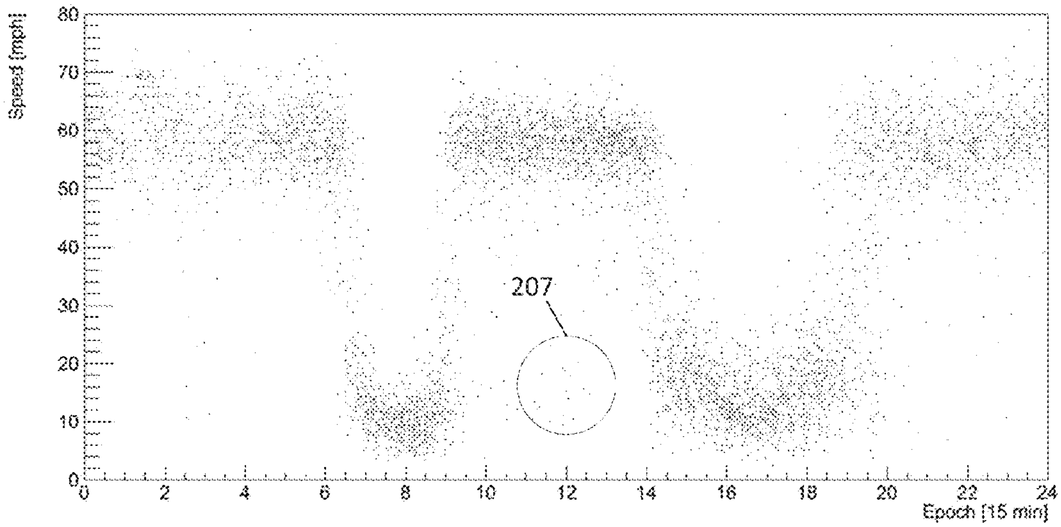
FIGS. 5A and 5B illustrate another example comparison of raw traffic data and simulated data.
Figure 5B:
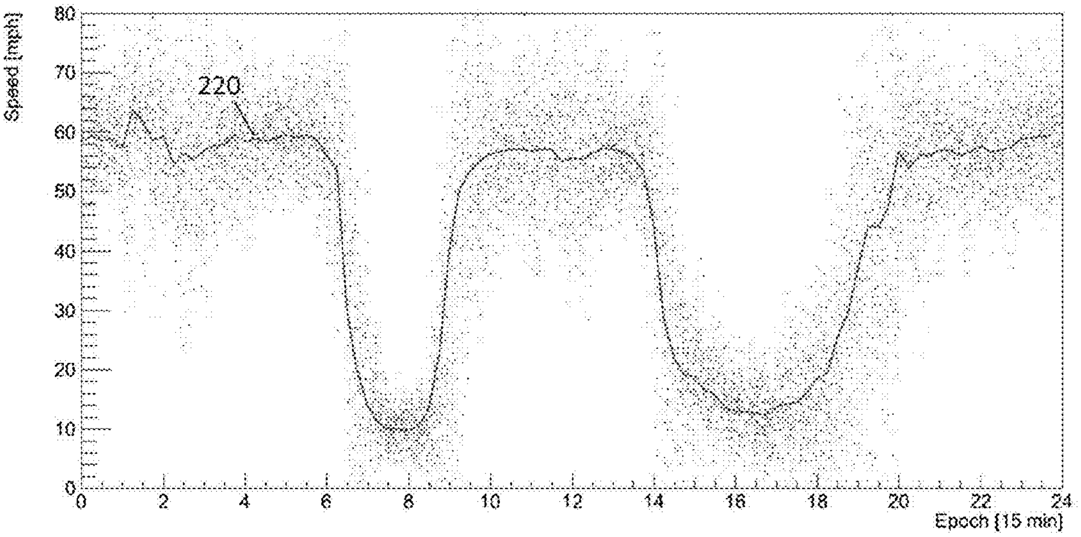

However, some discrepancies may be visible. For example, circle 201 in FIG. 2A illustrates portions of the raw data that may not be represented in the simulated traffic data. Circle 203 illustrates a shape in the simulated data of FIG. 2B that may not be present in the raw data. In another example, circle 207 in FIG. 5A illustrates portions of the raw data that may not be represented in the simulated traffic data of FIG. 5B.

The customer device 122 may be any type of computing device, including a personal computer, or a mobile device. A mobile device is a smart phone, a mobile phone, a personal digital assistant ("PDA"), a tablet computer, a notebook computer, a personal navigation device ("PND"), a portable navigation device, and/or any other known or later developed portable or mobile computing device.

The optional workstation 128 is a general purpose computer including programming specialized for the following embodiments. For example, the workstation 128 may receive user inputs for defining the threshold levels. The workstation 128 may receive user inputs for modifying the levels of specificity applied to particular users. The workstation 128 includes at least a memory, a processor, and a communication interface.

The developer system 121, the workstation 128, and the customer device 122 are coupled with the network 127. The phrase "coupled with" is defined to mean directly connected to or indirectly connected through one or more intermediate components. Such intermediate components may include hardware and/or software-based components.

The computing resources may be divided between the server 125 and the customer device 122. In some embodiments, the server 125 performs a majority of the processing. In other embodiments, the customer device 122 or the workstation 128 performs a majority of the processing. In addition, the processing is divided substantially evenly between the server 125 and the customer device 122 or workstation 128 ("hybrid embodiments").

Figure 6:
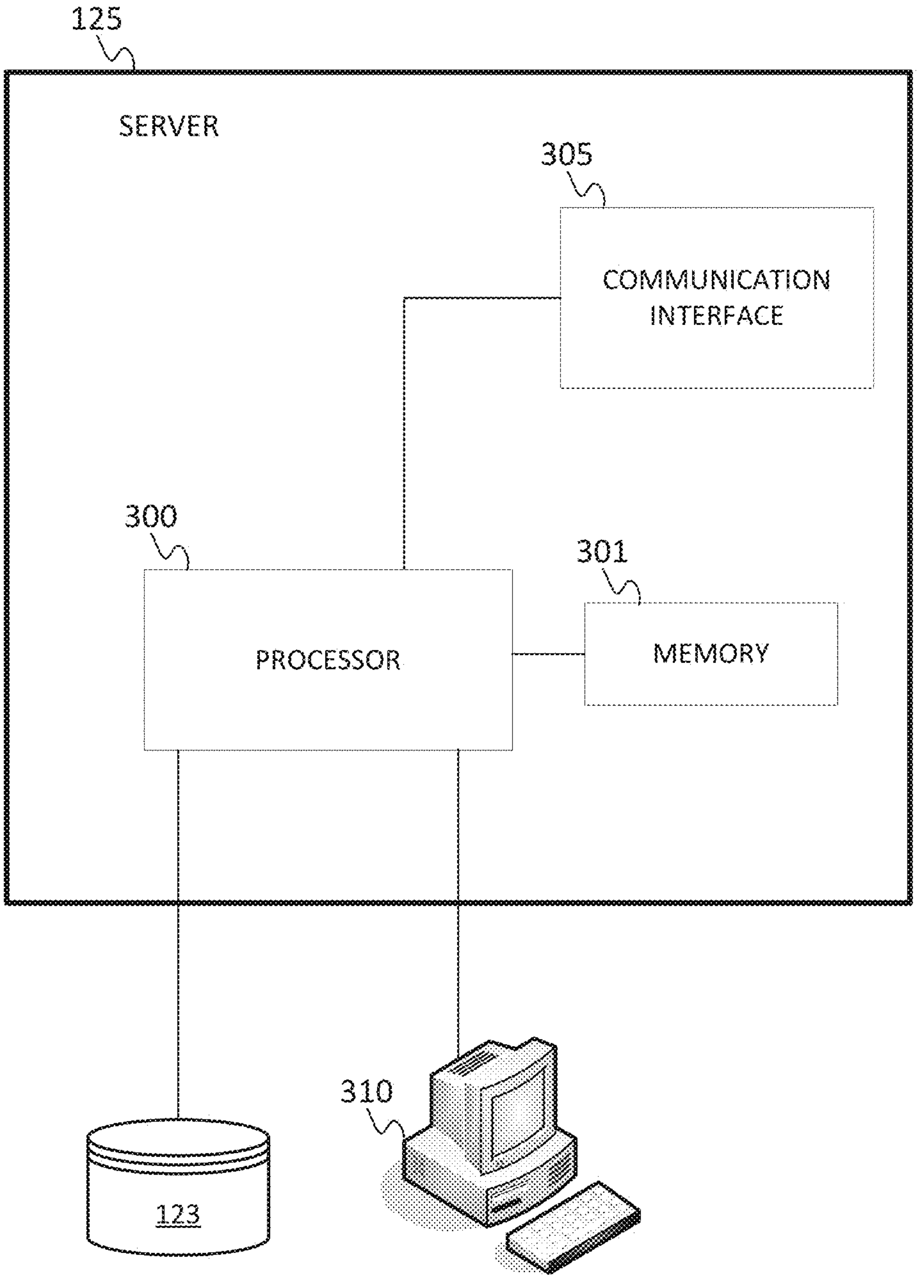
FIG. 6 illustrates an exemplary server of the system of FIG. 1.

FIG. 6 illustrates an exemplary server 125 of the system of FIG. 1. The server 125 includes a processor 300, a communication interface 305, and a memory 301. The memory includes computer program code for one or more programs and the processor 300 is configured to cause the server 125 to perform the programs. The server 125 may be coupled to a database 123 and a workstation 310. The workstation 310 may be used as an input device for the server 125. In addition, the communication interface 305 is an input device for the server 125. The communication interface 305 receives data indicative of user inputs made via the workstation 128 or the customer device 122.

The processor 300 is configured to receive traffic data measurements associated with multiple repeating time epochs. The time epochs may be 15 minutes, 1 hour, 1 day, or another time increment. The time epochs make up a vector. The vector may represent a day, a month, a year, or another time span.

The processor 300 divides the traffic data into clusters. The clusters include a centroid, or a central location, that defines the clusters. The cluster is the average location of the cluster. The centroid is variable, changing as vectors are added or removed from the cluster.

The processor 300 is configured to calculate statistical parameters for each of the clusters. The statistical parameters may include one or more of standard deviations, variances, averages, sample sizes, distances to other clusters, or other values.

The processor 300 is configured generate simulated traffic data based on the statistical parameters. For example, a data generating function may receive inputs of the standard deviation and the variable centroid and output simulated traffic data that substantially statistically equivalent to the measured traffic data that defined the cluster. The data generating function may generate data according to a normal distribution, a Gaussian distribution, a Poisson distribution, or another probability density function.

The processor 300 may generated the simulated traffic data locally or provide another device with the statistical parameters necessary to generate the simulated traffic data. For example, the processor 300 may be configured to provide the variable centroid location and the standard deviation value for one, some, or all of the clusters in response to a request for traffic data from another device. The processor 300 may select a cluster to generate the simulated traffic data from using a random number. Alternatively, a processor of the customer device 122 may directly receive traffic data measurements, divide the data into clusters, and calculate statistical parameters. Accordingly, the simulated traffic data may be generated on the customer device 122 or the statistical parameters may be sent to another mobile device or computer to generate the simulated traffic data.

The processor 300 may define the variable centroids through an iterative process. First, using a random algorithm, an initial centroid is selected for each of the clusters based on a predetermined pattern or a random variable. At this point, each of the clusters includes one traffic datum for each epoch. The processor 300 assigns additional traffic data to the clusters or the initial centroids. This changes the average location within each cluster, and new averages or centroid locations may be calculated every iteration or every predetermined number of iterations. As the centroids change, the traffic data assigned may change. That is a vector may be closer to a different cluster as the centroids are moved.

The iterative process of recalculating centroids may be repeated until a threshold is met. The threshold may be related to the change in quantity of traffic data with each cluster by a comparison of the difference in quantity between clusters and before and after a centroid recalculation. The threshold may be related to a Euclidean distance that one or more of the centroids changed by comparing a difference in location between the initial centroids and corresponding subsequent centroids to the threshold.

In one alternative, the processor 300 is configured to compare a difference in an average variance of the clusters from one iteration to the next. In another alternative, the processor 300 is configured to recalculate clusters until a steady state threshold is met. The steady state threshold may include any combination of a density threshold, a quantity threshold, or a variance threshold.

Figure 7:
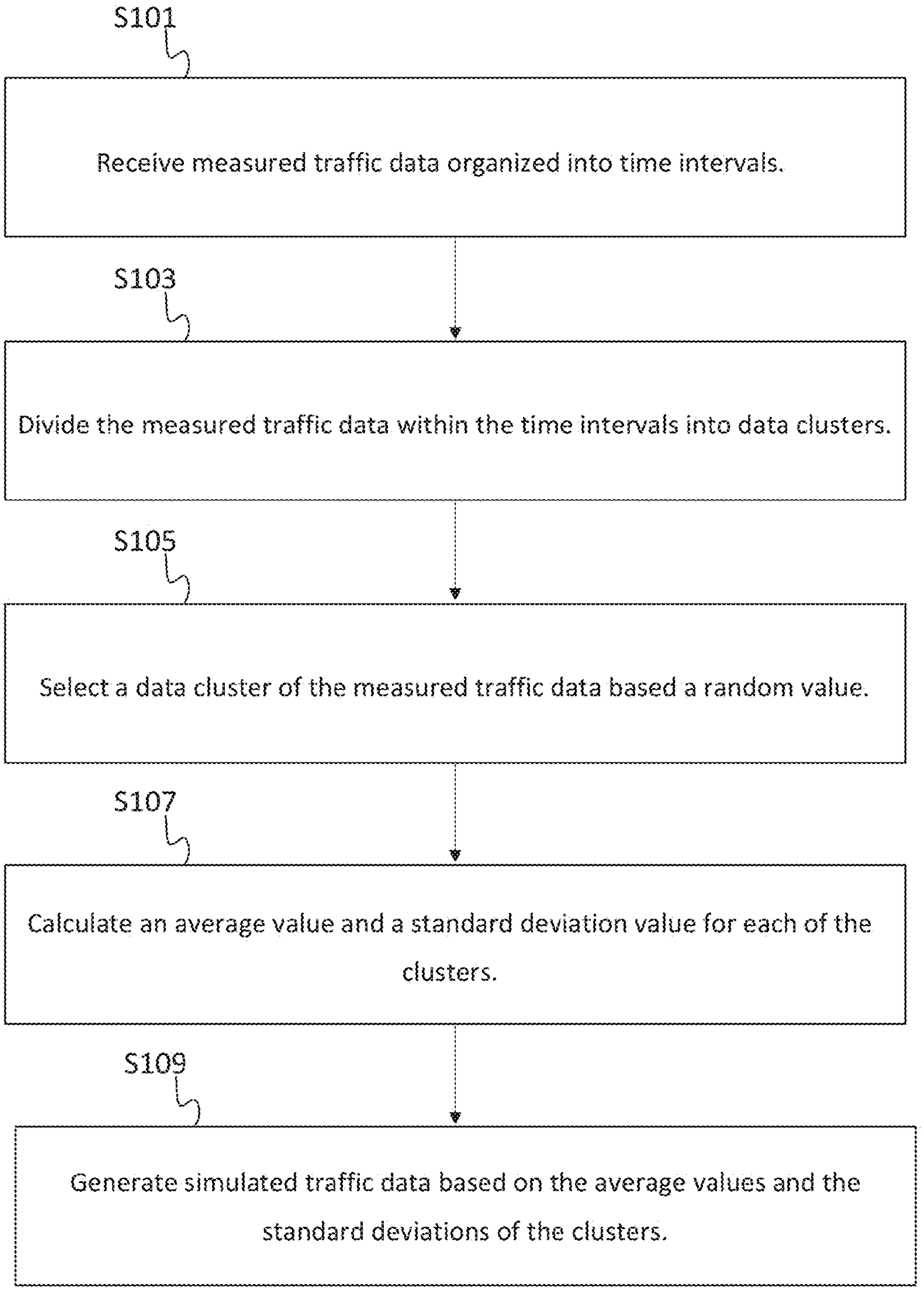
FIG. 7 illustrates an example flowchart for traffic data simulation.

FIG. 7 illustrates an example flowchart for traffic data simulation. The acts of the flowchart may be performed by the server 125, the customer device 122, or any combination thereof. Additional, different, or fewer acts may be provided.

At act S101, measured traffic data is received and organized into time intervals. The time interval may be a fraction of a day. The time intervals for a day may be arranged in a vector. The vector may have any number of components. The vectors may be classified as work days and non-workdays or by days of the week.

At act S103, the measured traffic data within the time intervals are divided into data clusters. The clusters may be uniformly sized in area based on the space defined by the vectors from act S101. The clusters may be uniformly sized in quantity based on the number of vectors in each cluster. Alternatively, the vectors may be sized dependent on a clustering technique. At act S105, one of the data clusters is selected based a random value. The clusters may be numbered according to the order they are created, an order of size or another order.

At act S107, an average value and a standard deviation value for each of the clusters are calculated. The average value and the standard deviation are provided to a probably density function. At act S109, simulated traffic data is generated by the probability density function based on the average values and the standard deviations of the clusters. The simulated traffic data is compiled from the output of the probability density function while cycling through the various clusters. A new cluster may be used for each data point or predetermined number of data points.

An input device for the customer device 122 may include one or more buttons, keypad, keyboard, mouse, stylist pen, trackball, rocker switch, touch pad, voice recognition circuit, or other device or component for inputting data. The input device may be combined with a display as a touch screen, which may be capacitive or resistive. The display may be a liquid crystal display (LCD) panel, light emitting diode (LED) screen, thin film transistor screen, or another type of display.

The processor 300 or a controller of the customer device 122 may include a general processor, digital signal processor, an application specific integrated circuit (ASIC), field programmable gate array (FPGA), analog circuit, digital circuit, combinations thereof, or other now known or later developed processor. The processor 300 or the controller of the customer device 122 may be a single device or combinations of devices, such as associated with a network, distributed processing, or cloud computing.

The memory 301 may be a volatile memory or a non-volatile memory. The memory 301 may include one or more of a read only memory (ROM), random access memory (RAM), a flash memory, an electronic erasable program read only memory (EEPROM), or other type of memory. The memory 301 may be removable from the mobile device 100, such as a secure digital (SD) memory card.

The communication interface 305 may include any operable connection. An operable connection may be one in which signals, physical communications, and/or logical communications may be sent and/or received. An operable connection may include a physical interface, an electrical interface, and/or a data interface. The communication interface 305 provides for wireless and/or wired communications in any now known or later developed format.

The network 127 may include wired networks, wireless networks, or combinations thereof. The wireless network may be a cellular telephone network, an 802.11, 802.16, 802.20, or WiMax network. Further, the network 127 may be a public network, such as the Internet, a private network, such as an intranet, or combinations thereof, and may utilize a variety of networking protocols now available or later developed including, but not limited to TCP/IP based networking protocols.

While the non-transitory computer-readable medium (e.g., memory 301) is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

As used in this application, the term 'circuitry' or 'circuit' refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

Processors suitable for the execution of a computer program include, by way of example, both general and special purpose microprocessors, and anyone or more processors of any kind of digital computer. Generally, a processor receives instructions and data from a read only memory or a random access memory or both. The essential elements of a computer are a processor for performing instructions and one or more memory devices for storing instructions and data. Generally, a computer also includes, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, are apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

We claim:

1. An apparatus comprising:
- at least one processor; and
- at least one memory including computer program code for one or more programs,
- the at least one memory and the computer program code configured to, with the at least one processor, cause the apparatus to perform at least the following:
- receive a request for simulated traffic data from a customer device;
- identify traffic data associated with time epochs;
- divide the traffic data into a plurality of clusters, wherein the plurality of clusters include variable centroids;
- calculate a standard deviation value for each of the plurality of clusters;
- generate simulated traffic data based on the standard deviations and the variable centroids while cycling through the plurality of clusters,
- wherein the simulated traffic data includes multiple points of pseudo traffic data for testing a potential layout for a road network; and
- provide the simulated traffic data in response to the request.

2. The apparatus of claim 1, wherein the at least one memory and the computer program code configured to, with the at least one processor, cause the apparatus to perform at least the following:
- select, using a random algorithm, an initial centroid for each of the plurality of clusters;
- assign additional traffic data to one of the initial centroids; and
- calculate a subsequent centroid based on an average of the additional traffic data and the initial centroid for one of the plurality of clusters.

3. The apparatus of claim 1, wherein the subsequent centroid is recalculated until a threshold is met.

4. The apparatus of claim 3, wherein the at least one memory and the computer program code configured to, with the at least one processor, cause the apparatus to perform at least the following:
- compare a difference in location between the one of the initial centroids and the subsequent centroid to the threshold.

5. The apparatus of claim 3, wherein the at least one memory and the computer program code configured to, with the at least one processor, cause the apparatus to perform at least the following:
- compare a difference in quantity between one of the plurality of clusters and the one of the plurality of clusters after the subsequent centroid is calculated.

6. The apparatus of claim 3, wherein the at least one memory and the computer program code configured to, with the at least one processor, cause the apparatus to perform at least the following:
- compare a difference in an average variance of the one of the plurality of clusters and the one of the plurality of clusters after the subsequent centroid is calculated.

7. The apparatus of claim 3, wherein the at least one memory and the computer program code configured to, with the at least one processor, cause the apparatus to perform at least the following:
- divide the traffic data into the plurality of clusters using a first number of clusters;
- divide the traffic data into the plurality of clusters using a second number of clusters;
- calculate a first variance using the first number of clusters; and
- calculate a second variance using the second number of clusters.

8. The apparatus of claim 1, wherein one of the plurality of clusters for the simulated traffic data is selected based on a random variable.

9. A non-transitory computer readable medium including instructions that when executed are operable to:
- receive, from a traffic camera, a traffic sensor, or a mobile device, measured traffic data organized into time intervals;
- divide the measured traffic data within the time intervals into a first plurality of data clusters;
- calculate a variance of the first plurality of data clusters;
- divide the measured traffic data within the time intervals into a second plurality of data clusters;
- calculate a variance of the second plurality of data clusters;
- perform a comparison of the variance of the first plurality of data clusters to the variance of the second plurality of data clusters;
- calculate, based on the comparison, statistical parameters of the measured traffic data within the time intervals;
- generate multiple points of simulated traffic data based on the statistical parameters while cycling through the first plurality of data clusters or second plurality of data clusters; and
- provide the simulated traffic data in response to a request.

10. The non-transitory computer readable medium of claim 9, the instructions configured to:

select one of the plurality of clusters based a random value.

11. A method comprising:

receiving a request for traffic data;

identifying traffic data collected by sensors, cameras, or mobile devices and associated with multiple repeating time epochs;

dividing the traffic data into a plurality of clusters;

receiving, by a processor, an average value and a standard deviation value for each of the plurality of clusters;

executing a simulation to produce a set of pseudo traffic data for testing a road network based on a random variable, the average value and the standard deviation value for the plurality of clusters; and providing the pseudo traffic data in response to the request for traffic data.

12. The method of claim 11, wherein the traffic data is divided into the plurality of clusters using a random algorithm.

13. The method of claim 12, wherein the random algorithm includes an initial centroid for each of the plurality of clusters and additional traffic data is assigned to the initial centroids to calculate subsequent centroids based on averages of the additional traffic data and the initial centroids.

14. The method of claim 13, wherein the subsequent centroids are calculated as additional traffic data is added to the plurality of clusters until a threshold is met.

15. The method of claim 14, wherein a difference in location between one of the initial centroids and a corresponding one of the subsequent centroids is compared to the threshold.

16. The method of claim 14, wherein a difference in quantity between one of the plurality of clusters and the one of the plurality of clusters after the subsequent centroids is calculated.

17. The method of claim 14, wherein a difference in an average variance of the one of the plurality of clusters and the one of the plurality of clusters after the subsequent centroids is calculated.

18. The method of claim 14, wherein the random variable designates one of the plurality of clusters.

* * * * *